March 31, 1953  E. M. SKIPPER ET AL  2,632,936
METHOD AND APPARATUS FOR FORMING CERAMIC BODIES
Filed May 22, 1950  3 Sheets-Sheet 2
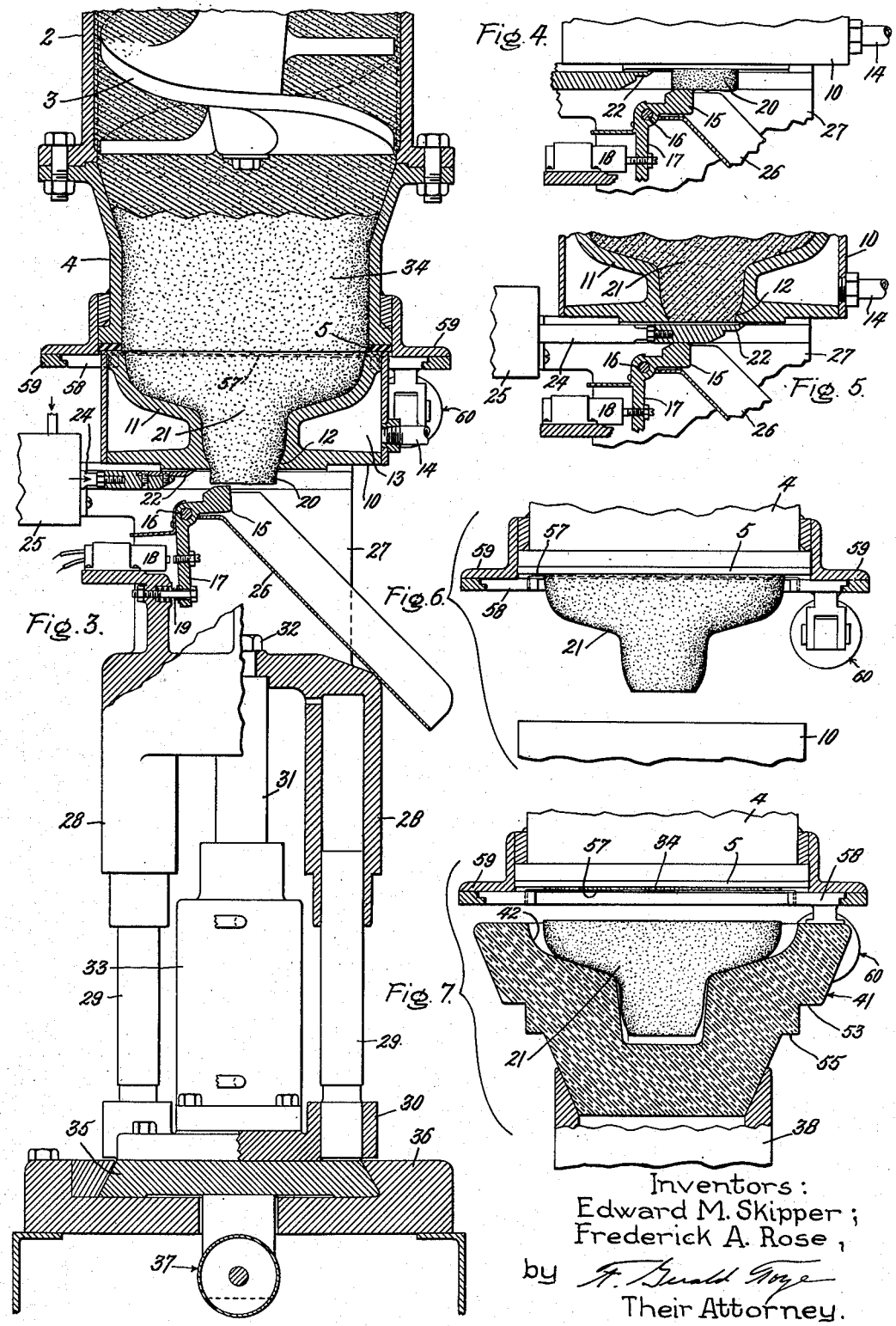
Inventors:
Edward M. Skipper;
Frederick A. Rose,
by F. Gerald Goye
Their Attorney.

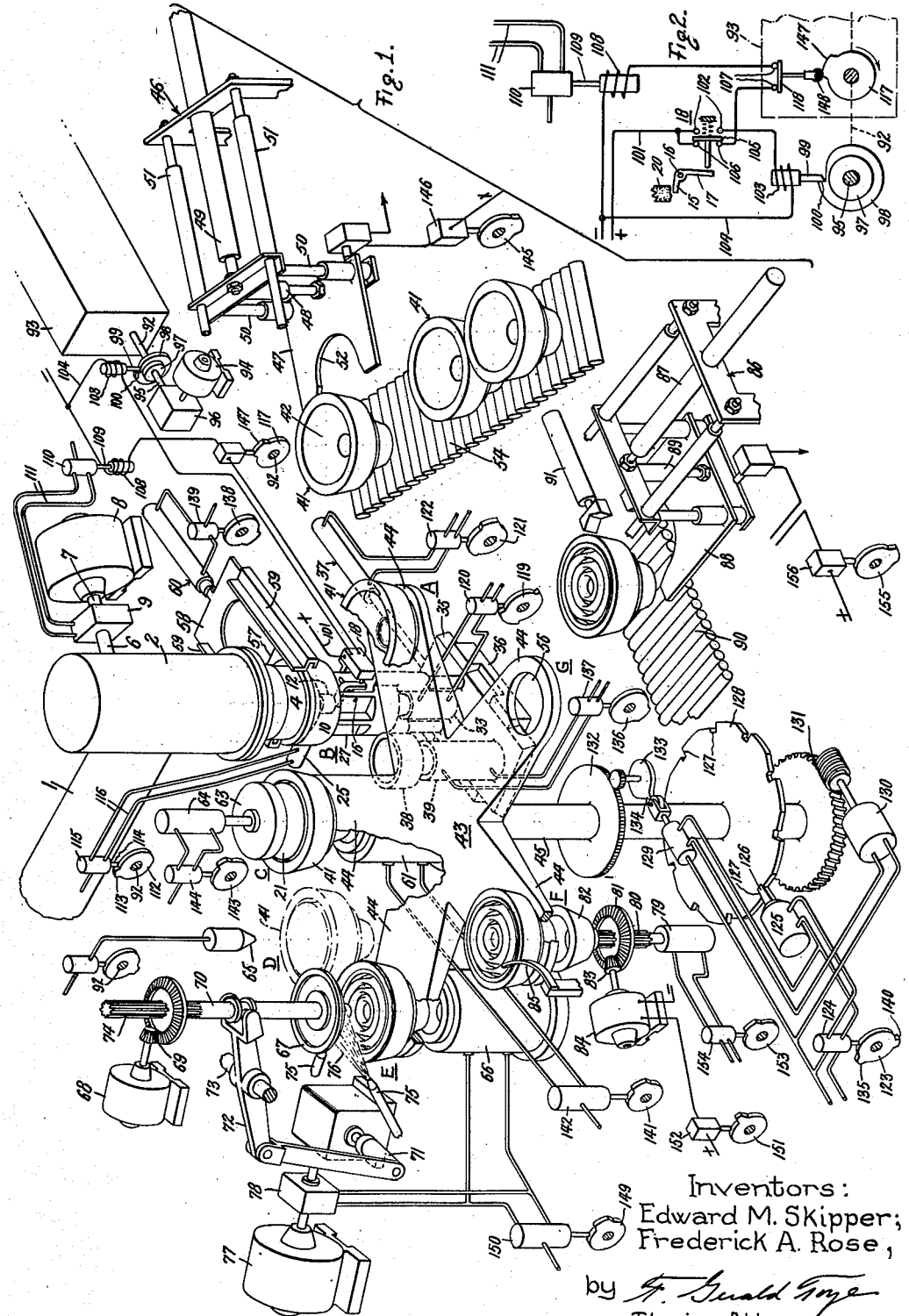
March 31, 1953  E. M. SKIPPER ET AL  2,632,936
METHOD AND APPARATUS FOR FORMING CERAMIC BODIES
Filed May 22, 1950  3 Sheets-Sheet 1
Inventors:
Edward M. Skipper;
Frederick A. Rose,
by  Their Attorney.

March 31, 1953    E. M. SKIPPER ET AL    2,632,936
METHOD AND APPARATUS FOR FORMING CERAMIC BODIES
Filed May 22, 1950                           3 Sheets-Sheet 3
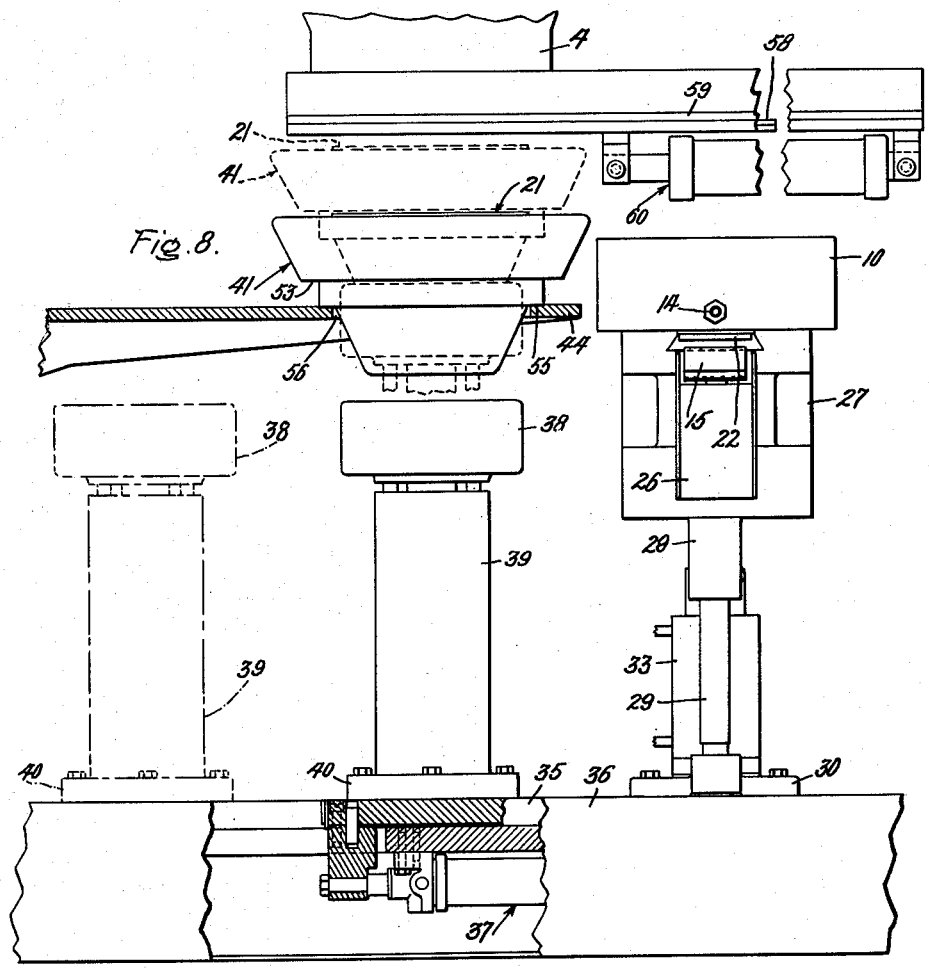
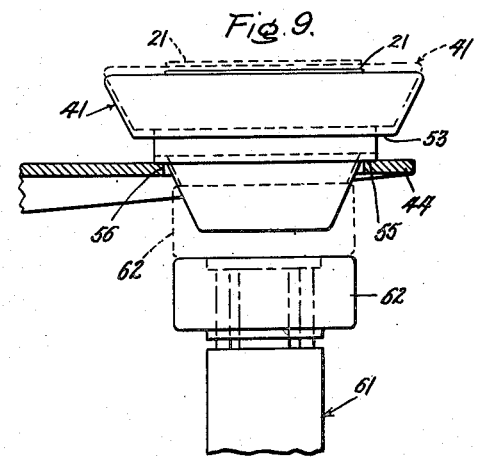
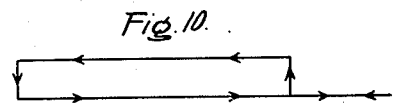
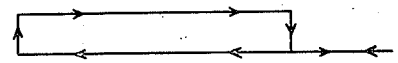
Inventors:
Edward M. Skipper;
Frederick A. Rose,
by
Their Attorney.

Patented Mar. 31, 1953

2,632,936

UNITED STATES PATENT OFFICE 2,632,936

METHOD AND APPARATUS FOR FORMING CERAMIC BODIES

Edward M. Skipper and Frederick A. Rose, Baltimore, Md., assignors to General Electric Company, a corporation of New York Application May 22, 1950, Serial No. 163,506

13 Claims. (Cl. 25—3)

This invention relates to a method and apparatus for forming ceramic bodies and, more particularly, to a method and apparatus for forming a plastic ceramic body and shaping said body to a desired external configuration and for repeating said forming and shaping on a mass production basis as desired.

While, as will be evident to those skilled in the art, the present invention is considered to have utility in connection with the production of various different types of ceramic bodies, it is found to have particular utility in connection with the production of high voltage electrical insulator bodies. An example of the latter type of body is a suspension type electrical insulator body where the body has a generally convex upper surface with a knob on top and a corrugated under-surface. In view of the fact that such bodies have a fairly complex external configuration and may be of appreciable diameter, for example 10" in diameter, there are numerous problems involved in producing such bodies on a mass production basis and it is with the solution of such problems that the present invention is concerned.

These problems will become more evident from a consideration of the nature of the material used to make such bodies. For example, in the production of a typical insulator body, dry ceramic materials, such as finely ground flint, feldspar, china clay and ball clay, and water are mixed together to produce a substantially homogeneous mass of material. The plasticity of the material at this point will depend primarily upon the amount of water used in the mixing and, if an excess has been used in order to obtain uniform dispersion of the various ceramic ingredients throughout the mass of material, the excess water is removed (by procedures known to those in the art) until the material has sufficient stiffness to enable it to be formed and shaped preparatory to firing it in a kiln. At this point the material is in the so-called "green" state wherein it is plastic but has substantial stiffness so that it takes appreciable pressure to deform it. Thus there is the problem of working with a fairly dense, heavy and stiff plastic material.

Plastic ceramic material of this composition has been successfully produced by dry mixing the dry ceramic ingredients and then adding a predetermined amount of water and continuing the mixing until the water is substantially uniformly distributed throughout the material whereby the material is in the so-called green state. Such material has been successfully compacted into a plastic ceramic mass by means of a pug mill which will extrude the compacted material, thus making it available for subsequent shaping. Heretofore, such shaping has been accomplished by manual operations since no suitable method and apparatus has been provided, insofar as we are aware, for taking the output from the pug mill and processing it mechanically to the desired external configuration. The present invention provides such a suitable method and apparatus.

There is also a time factor to consider in forming and shaping such bodies. This arises by virtue of the fact that the material dries out and if it becomes too dry it becomes prohibitively difficult to mold into shape, particularly on a production basis. Thus, while the material is brought to a degree of dryness where it is still plastic and thus can be formed and shaped, such forming and shaping should be accomplished while the material is sufficiently plastic to be worked effectively. This introduces the problem of sequencing the forming and shaping operations so that they will take place within a predetermined time interval. In the insulator art, the material is preferably in the so-called "green" state for effective forming and shaping of the insulator body.

Finally, because of the appreciable size and weight of some bodies which it is desired to produce, such as for example a 10" suspension type insulator body, the mass production equipment must be sufficiently rugged to handle these bodies and yet synchronize the various operations so that production can continue on a steady basis. This introduces a problem of keying the forming and shaping operations to the output of a suitable feeding means, such as a pug mill, so that a predetermined amount of plastic ceramic material will be made available for forming and shaping in time sequence and the forming and shaping of an individual body will not be started until a sufficient amount of material is available. The present invention also takes cognizance of this problem.

It is therefore a primary object of the present invention to provide a method and apparatus for forming a plastic ceramic body, such as an electrical insulator body, and shaping said body to a desired external configuration, and for forming and shaping such bodies on a mass production basis as desired whereby the cost of producing such bodies is decreased. Other objects of the present invention are to provide such a method and apparatus whereby plastic ceramic material is compacted, formed into an individual body and subsequently shaped to a desired external configuration in accordance with a predetermined time sequence; whereby the over-all time taken to form and shape an individual body is decreased; whereby the subsequent shaping of an individual body is not started until a correct amount of plastic ceramic material is made available for such shaping; whereby an individual body is preshaped before it is finally shaped; and whereby the pre-shaped body is supported while it is being finally shaped.

Briefly stated, the method of the present invention includes the steps of compacting loose ceramic material having a moisture content in the range from 18% to 23% into a plastic ceramic mass having a substantially uniform moisture content, preshaping a portion of such compacted material, severing the preshaped portion from the parent mass of compacted material, and subsequently shaping the severed portion to a desired external configuration. For mass production, this cycle of steps is repeated and a portion of the material preshaped during one cycle is utilized to initiate the next succeeding cycle thus insuring that severing and subsequent shaping will not take place unless a preshaped body is available for such steps. This keys the cycles together. The various steps within a cycle take place in a predetermined sequence, time controlled so that each step may be performed properly.

In a preferred embodiment of an apparatus for carrying out this method, the compacting is accomplished by means of a pug mill which extrudes the compacted plastic ceramic material. A preshaping mold is located in extension of the nozzle of the pug mill and receives the extruded material. When the preshaping mold is filled extrusion is stopped and stopping is controlled by having a part of the extruded material actuate a trip member which is operatively connected to means to stop the pug mill.

This same trip member is also operatively connected to a control cam mechanism which begins operating to start the subsequent steps of transferring the preshaped material away from the pug mill and subsequently shaping said preshaped material to a desired external configuration. In the preferred embodiment of the present invention referred to, the transfer of the preshaped material away from the pug mill is accomplished by withdrawing and preshaping mold from the preshaped material, substituting a transfer mold for the preshaping mold, severing the preshaped material from the plastic ceramic material remaining in the nozzle of the pug mill, and seating the transfer mold on a conveyor which then moves the transfer mold and the material contained therein away from the pug mill.

A plurality of shaping stations are located along the path of movement of the conveyor and these shaping stations include a station for tamping the preshaped material while it is in the transfer mold, a station for spraying oil on the surface of said material which was exposed by severing it from the pug mill nozzle, a station for forming corrugations on said exposed surface, a station for trimming excess material from the periphery of said exposed surface, and a station for removing the mold and the finally shaped material contained therein from the conveyor. A station for placing the empty transfer mold on the conveyor is located in advance of the pug mill station.

The transfer mold has a mold cavity with an internal wall configuration corresponding to the external wall configuration desired for a portion of the body being shaped. In the case of a suspension type electrical insulator body, the internal wall configuration of the transfer mold cavity will correspond to the external wall configuration desired for the upper surface of said insulator body. The pre-shaping mold has a mold cavity with an internal wall configuration corresponding substantially to the external wall configuration desired for a portion of the body being shaped. Thus, in the case of the insulator body referred to, when the transfer mold is substituted for the preshaping mold the body will practically "fit" the transfer mold. During the tamping and corrugating operations the body will be forced intimately against the interior wall surface of the transfer mold cavity thus finally shaping the upper surface of the insulator body, and the lower surface of the insulator body will be finally shaped by the corrugating and trimming operations.

In order to achieve mass production, after the conveyor moves a severed preshaped body away from the nozzle of the pug mill, the preshaping mold is repositioned beneath this nozzle and the pug mill starts feeding again to fill the preshaping mold and thus form another preshaped body. When this is accomplished the preshaping mold is again withdrawn, and another transfer mold moves into position to receive the preshaped body which is then severed from the plastic ceramic material remaining in the nozzle of the pug mill. A second conveyor moves the second transfer mold, and the second preshaped body supported thereby, away from the pug mill. Meanwhile the first preshaped body has progressed from the tamping station to the station at which the exposed surface of the first preshaped body is corrugated. Thus, there are a plurality of operations occurring simultaneously and after each body is preshaped it is moved through the sequence of shaping operations following which it is removed from the conveyor. Simultaneously with the removal of a completely shaped body from the conveyor a new transfer mold is placed on the conveyor in advance of the pug mill so that there is always a transfer mold available to carry the preshaped body away from the pug mill.

It is therefore seen that in the preferred embodiment of the apparatus referred to, apparatus is provided for preshaping a body, transferring the preshaped body away from the preshaping means and finally shaping the preshaped body to a desired external configuration. This apparatus is of course concerned with the forming and shaping of an individual body. In addition, apparatus is provided for causing repetition of such forming and shaping whereby ceramic bodies can be produced on a mass production basis. The apparatus for forming and shaping an individual body is time controlled so that the various pieces of apparatus come into operation in a predetermined sequence. For mass production, the various pieces of apparatus are so controlled that a new body starts its sequence in proper relation to a previous body already in the sequence. This is achieved by providing an interlock arrangement which starts each sequence of operations following preshaping of an individual body and which guarantees that a sequence of operations for that body will not be started until the body is actually preshaped. Thus, there is proper correlation between the repetitive cycles of forming and shaping.

Other objects and advantages of the present invention will become more apparent from the following detailed description taken in conjunction with the attached drawings in which Fig. 1 is a schematic perspective view of a preferred embodiment of the complete apparatus, the various control cams being shown "exploded" to locations adjacent the apparatus which they control; Fig. 2 is a circuit diagram showing the means of initiating a cycle of operations and for keying consecutive cycles in proper relation to each other; Fig. 3 is an elevation view, mostly in section, showing apparatus for preshaping the plastic ceramic material; Fig. 4 is a view of a portion of the apparatus shown in Fig. 3, said portion being shown at a subsequent stage in the operation of the apparatus; Fig. 5 is a view similar to Fig. 4 at still a later stage in the operation of the apparatus; Fig. 6 is a view of a portion of the apparatus shown in Fig. 3 with the preshaping means being shown withdrawn from the preshaped body; Fig. 7 is a view similar to Fig. 6 showing a transfer means substituted for the withdrawn preshaping means and showing the preshaped body severed from the plastic ceramic material remaining in the nozzle of a pug mill; Fig. 8 is an elevation view, partly in section, of the apparatus for selectively moving the pre-shaping means and the transfer means into and out of position with respect to the pug mill, said figure including a dotted line showing of parts of this apparatus as they are positioned at a different stage in the operation of the apparatus from the stage shown in full lines; Fig. 9 is a detail view showing mechanism for raising the transfer means from a supporting conveyor, said mechanism and transfer means being shown in raised position in dotted outline; Fig. 10 is an arrow line diagram of the path of movement followed by the apparatus which places a transfer means on the conveyor; and Fig. 11 is a diagram similar to that of Fig. 10 showing the path of movement followed by the apparatus which removes a transfer means from the conveyor.

As mentioned above, the present invention finds particular utility in connection with forming and shaping electrical insulator bodies and therefore the preferred embodiment of the invention shown in the drawings is an embodiment for forming and shaping high voltage suspension type electrical insulator bodies. It will be recalled from the preceding discussion that such an insulator body has a fairly complex external configuration, the upper surface of the body being generally convex with a knob projecting therefrom and the lower surface of the body being corrugated and containing a central opening for receiving an insulator pin. In the following description it is pointed out that the preshaping of such a body provides substantially the correct amount of material for a particular body and also substantially forms the upper surface of the insulator while the subsequent shaping completes the formation of said upper surface and also shapes the undersurface.

Since a particular sequence of final shaping operations starts after an individual body has been preshaped, the detailed description of the present invention starts with the apparatus provided to achieve such preshaping.

To provide a mass of plastic ceramic material suitable for forming and shaping into an insulator body, loose ceramic material is fed through an inlet conduit 1 to a pug mill 2. (See Fig. 1.) As a typical example of the material fed into conduit 1, such material may be finely ground flint, feldspar, china clay and ball clay, thoroughly mixed with from 18% to 23% of water by weight of the combined water and ceramic ingredients. Within the pug mill 2 the loose ceramic material is compacted into a plastic ceramic mass by means of an auger 3 (see Fig. 3) which feeds the ceramic material to the pug mill nozzle 4 from which it is discharged through a nozzle discharge opening defined by the gasket 5. It will be observed that the nozzle 4 is somewhat elongated and that the discharge opening defined by the gasket 5 is transverse to the direction of elongation.

The pug mill auger 3 is rotated by a shaft 6 which is coupled to the auger by suitable gearing, not shown. The shaft 6 is, in turn, driven by the shaft 7 of motor 8 and is adapted to be releasably coupled to the shaft 7 by a suitable clutch means contained within the housing 9. Thus, the motor 8 can drive auger 3 to feed compacted plastic ceramic material from the pug mill nozzle 4 and such feeding can be initiated or discontinued by means of the clutch mechanism contained within housing 9.

In order to preshape an individual body of plastic ceramic material, a preshaping mold 10 is positioned beneath the pug mill nozzle 4. In the apparatus shown in the drawings the pug mill is shown as being a vertical pug mill since, with respect to the conveyor mechanism to be described later on, it is found that this is a particularly convenient positioning of the pug mill for forming bodies such as suspension type insulator bodies where the body is generally dish-shaped in total outline.

The preshaping mold 10 is preferably made of hard metal so that it can withstand the substantial pressure required to compact the plastic ceramic material into said mold and has a mold cavity defined by the internal mold walls 11. These walls 11 are flared to define an inlet opening to the mold cavity. As will be noted from Fig. 3, the upper edges of the mold cavity walls 11 are positioned against the gasket 5 which defines the discharge opening of the pug mill nozzle 4. Thus, the inlet opening to the preshaping mold cavity is positioned in registry with the discharge opening of the pug mill nozzle 4.

At the lower portion of the preshaping mold 10, the mold cavity walls 11 define an exit opening 12 which has the dual function of shaping the knob of the insulator body and of providing an escape port through which excess plastic ceramic material may escape from within the mold. As will be noted from Fig. 3, the exit opening 12 is positioned substantially opposite to the inlet opening of the preshaping mold cavity and is in extension of the pug mill nozzle 4.

The preshaping mold 10 is a jacketed mold having a jacket space 13 adapted to receive a heating medium such as hot water, steam, etc. from a supply source 14. In this manner, the mold cavity walls 11 may be heated to thus heat the adjacent surface of plastic ceramic material and dry this adjacent surface sufficiently so that when the preshaping mold is withdrawn from the preshaped body the mold will not pull away pieces of material from this body.

Adjacent to the exit opening 12 of the preshaping mold 10 and in the path of movement of material which may be forced through said opening, is a bell crank lever 15 pivotally mounted at 16 to the structure which supports the preshaping mold. The bell crank lever 15 has an arm 17 which is adapted to actuate a micro-switch 18 whereby the feed from the pug mill is stopped and a cycle of subsequent operations started in a manner to be described later on. Arm 17 is normally biased by spring 19 so that it is away from micro-switch 18. When the pub mill 2 has extruded a sufficient amount of plastic ceramic material to fill the mold cavity of preshaping mold 10 and has continued such feeding to force excess plastic ceramic material out of the exit opening 12, such excess material will abut against lever 15 and pivot this lever to actuate micro-switch 18. This position of the apparatus is shown in Fig. 4, where the excess plastic ceramic material 20 is shown as having pivoted lever 15 to a position wherein the arm 17 of this lever has actuated microswitch 18.

As mentioned above, the feed from the pug mill is stopped when this occurs and the next step is to sever the excess ceramic material 20 from the pre-shaped body 21. Referring to Fig. 5, it is seen there that the blade 22 has moved across the mouth of exit opening 12 and has severed the material 20 from the body 21. When the material 20 is severed it drops upon the inclined chute 26 which guides it away from the preshaping mold. The severing of the excess material 20 releases the pressure on lever 15 so that, under the influence of spring 19, this lever returns to the position shown in Fig. 3.

After the excess material 20 has been trimmed from the preshaped body 21 this body is then ready to be transferred away from the pug mill nozzle 4 for subsequent shaping operations. As a first step, the preshaping mold 10 is withdrawn from the preshaped body 21. The apparatus which is used to accomplish this includes a preshaping mold supporting structure 27 (see Fig. 3) having a pair of elongated sleeve members 28 which are movable up and down with respect to guide rods 29, the latter being positioned on a base 30. The elongated sleeves 28 are caused to move up and down by means of a movable piston 31 which is connected to the mold supporting structure 27 by means such as bolt connection 32. The piston 31 is received within a cylinder 33 and suitable control means, described later, is provided to cause the piston to move with respect to the cylinder 33, the latter being attached to the base 30 from which the guide rods 29 extend. In the position of the apparatus as shown in Fig. 3, the piston 31 is shown as being extended with respect to cylinder 33 whereby the elongated sleeves 28 are in their upper, i. e. elevated, position and the preshaping mold 10 is in engagement with the pug mill nozzle 4. When the piston 31 is retracted the elongated sleeves 28 will move down along guide rods 29 to withdraw the preshaping mold 10 downward from the preshaped body of plastic ceramic material 21. This position of the preshaping mold 10 is shown in Fig. 6.

At this point the preshaped body of plastic ceramic material 21 is still attached to the parent mass of plastic ceramic material 34, the material 34 being contained within the pug mill nozzle 4. The preshaped material 21 has sufficient stiffness so that it hangs, i. e. depends, from the parent mass 34 without losing its shape.

After the preshaping mold 10 is drawn downward from the preshaped body 21, this mold is moved away from beneath the depending body 21. The apparatus used to accomplish this includes a movable base member 35 upon which the base member 30 is seated. As previously mentioned, the upstanding guide rods 29, cylinder 33, and thus the preshaping mold and its supporting structure 27 are all supported on the base member 30 so that when this base member is moved the whole elevator assembly, including the preshaping mold 10, will be moved. The movable base member 35 is actually a slidable platform which is keyed to, and guided by, a supporting base 36 and is movable with respect to the supporting base 36 by means of a piston and cylinder assembly 37. Under force exerted by this piston and cylinder assembly, after the preshaping mold 10 is moved downward from the preshaped body 21, it is then moved along the supporting base 36 until it is away from beneath the preshaped body 21. The position of the preshaping mold after it has been so moved away is shown in Fig. 8 of the drawings.

A second elevator mechanism is also positioned upon the movable platform 35 and the purpose of this second elevator mechanism is to position a transfer mold, to be described later, in position to receive the preshaped body 21 and to then seat the transfer mold on a conveyor. This second elevator mechanism (see Fig. 8) includes an elevator head 38 which is movable up and down with respect to the elevator body 39 under the control of a control means to be described later. The elevator body 39 has a base 40 which is secured to the movable platform 35 and the positioning of the bases 40 and 30 (the base for the preshaping mold 10 supporting structure) is such that when the preshaping mold has been moved away from beneath the preshaped body 21, the elevator head 38 will be moved beneath this body. In order to appreciate this positioning more fully, reference is made to Fig. 8 where the dotted line showing of the elevator head 38 and elevator body 39 shows the position of this elevator assembly when the preshaping mold is positioned beneath the preshaped body 21. In the full line showing of Fig. 8 the preshaping mold 10 has been shifted from beneath the preshaped body 21, to the right, and the elevator head 38 has moved to the right to a position where it is beneath the preshaped body 21.

A transfer mold 41 is provided to support the preshaped body 21 while it is being transferred away from the pug mill nozzle 4 and also while it is being finally shaped to a desired external configuration. The transfer mold 41 is preferably a plaster of Paris mold having a mold cavity defined by an internal wall surface 42 (see Fig. 7). The configuration of wall surface 42 corresponds to the desired external wall configuration for the surface of the preshaped body 21 which is received within said mold cavity. For the insulator body example being considered, the configuration of the internal wall surface 42 corresponds to the configuration desired to the upper surface of the insulator body, including of course the knob portion of this upper surface.

The transfer mold 41 is brought into the position where it can receive the preshaped body 21 by means of a conveyor mechanism which is indicated generally by the reference numeral 43 (see Fig. 1). As shown in Fig. 1, this conveyor mechanism 43 is a rotatable turntable conveyor mechanism having a plurality of conveyor arms which are adapted to be moved simultaneously, in successive steps, under the control of an indexing mechanism which will be described later. Referring again to Fig. 1, it is seen that the conveyor 43 has five radially extending conveyor arms 44 lying in a common plane, each of said arms being similarly shaped, of the same length, and being equally spaced apart from each other so as to form a multi-arm generally star shaped or spider shaped conveyor member. The length of each conveyor arm 44 is such that, in view of the positioning of the conveyor support shaft 45 with respect to the pug mill nozzle 4, the end portion of the conveyor arm will pass beneath the pug mill nozzle 4. In view of the shaping operations which are performed on the preshaped body 21, five conveyor arms 44 are provided but, as will be more evident from the subsequent description, more or less than five conveyor arms could be provided depending upon the number of shaping operations it is desired to employ.

As previously mentioned, the conveyor 43 has a driving mechanism which indexes the conveyor arms 44 in successive steps so that the end of a particular conveyor arm 44 will ultimately travel in a complete circle. For the particular arrangement shown in Fig. 1 this indexing is accomplished, by means described later, so that the end of a particular conveyor arm 44 moves ten times in describing a complete circle. In order to clarify the locations at which the conveyor arms are stopped we have designated some of these locations by capital letter designations and refer to such locations as being stations.

The first such station referred to is station A where an empty transfer mold 41 is placed on a conveyor arm 44. This is accomplished by an apparatus indicated generally by the reference numeral 46 (see Fig. 1). This apparatus, which may be designated broadly as the transfer mold put-on apparatus, includes a movable plate 47 which is movable up and down by means of a piston and cylinder assembly 48 and which is movable from front to rear and vice versa by means of a piston and cylinder assembly 49. The up and down movement of the plate 47 is guided by sleeve and rod assemblies 50 and the front and rear movement of said plate is guided by sleeve and rod assemblies 51. The plate 47 has a recessed front edge 52 which enables the plate 47 to move under the shouldered surface 53 of a transfer mold 41 whereby the plate 47 can lift the transfer mold.

Referring to Fig. 10, the path of movement of plate 47 starts with movement of said plate to the left, from its position as shown in Fig. 1, so that the plate moves toward a transfer mold 41 until it engages said mold whereby the shouldered surface 53 will be above the plate. In order to have a transfer mold available for positioning on the conveyor arm 44 at station A, a plurality of empty transfer molds 41 are located on a roller conveyor 54 and the arrangement is such that a single transfer mold 41 will be at the end of the roller conveyor 54 and in position whereby it can be engaged by the lifting plate 47 when an empty conveyor arm 44 is at station A.

The movement of the lifting plate 47 toward the transfer mold 41 which is available for positioning is caused by a control means described later and is in response to force exerted by the cylinder and piston assembly 49. After the plate 47 has engaged this particular transfer mold 41, the plate stops its movement to the left and starts moving upward in response to force exerted by the piston and cylinder assembly 48, to lift the transfer mold 41 up from the roller conveyor 54. When the transfer mold 41 has been lifted a predetermined distance then, in response to force exerted by piston and cylinder assembly 49, plate 47 carries the transfer mold 41 over to the conveyor arm 44 located at station A and when the transfer mold is positioned above the end portion of the conveyor arm this particular movement of the plate 47 ceases. Then, in response to force exerted by the cylinder and piston assembly 48, the plate 47 descends to seat the transfer mold 41 on the conveyor arm 44.

In seating the transfer mold, the plate 47 descends until the shouldered surface 55 on the transfer mold 41 rests on the upper surface of the end portion of the conveyor arm 44. Referring to Figs. 1 and 9, it is noted that the end portion of a conveyor arm 44 has a circular opening 56 formed therein and this circular opening is of such size that the lower portion of the transfer mold 41 can extend downward through the opening with the shouldered surface 55 of the transfer mold engaging the upper surface of the end portion of the conveyor arm 44 about the periphery of the opening 56. After the transfer mold 41 is thus seated, the plate 47 moves back, under force exerted by the piston and cylinder assembly 49, until the plate 47 is back in the position shown in Fig. 1. The complete path of movement of the plate 47 is shown by the arrow line diagram of Fig. 10.

After the empty transfer mold 41 is seated on the conveyor arm 44 at station A, this particular conveyor arm indexes, i. e. moves counterclockwise as viewed in Fig. 1, until the conveyor arm reaches station B, at which station the transfer mold 41 is positioned beneath the preshaped body 21. Prior to this, of course, the preshaping mold 10 has moved down and away from the preshaped body 21, i. e. to the position shown in Fig. 8, and the transfer mold elevator assembly, which includes the elevator head 38, has been positioned beneath the preshaped body 21. When the transfer mold 41 is positioned at station B, the elevator head 38 moves upward, in response to a control means described later, to the dotted line position shown in Fig. 8. In the course of such movement, the elevator head 38 lifts the transfer mold 41 from within the opening 56 which is in the end portion of the conveyor arm 44 and positions the transfer mold 41 adjacent to the preshaped body 21, so that said mold can receive said body. This positioning of the transfer mold is shown in Fig. 7 and also in dotted outline in Fig. 8.

When the transfer mold 41 has been thus positioned, a wire cut-off 57 moves across the discharge opening of pug mill nozzle 4 and severs the preshaped body 21 from the parent mass of plastic ceramic material 34 which remains within the nozzle 4. The wire cut-off 57 is carried by a movable plate member 58 which is supported by guide supports 59 (see Fig. 1). A piston and cylinder assembly 60, which is controlled by a control means described later, moves the plate member 58 along the guide supports 59 and thus causes movement of the wire cut-off 57. After the wire cut-off 57 has moved across the discharge opening of pug mill nozzle 4 to sever the preshaped body 21 from the parent mass 34, the wire cut-off is moved back to its starting position which is shown in Fig. 1.

The severed preshaped body 21 drops into the closely adjacent mold cavity of the transfer mold 41, this being the position of the body 21 as shown in Fig. 7. The elevator head 38 then moves downward from its dotted line position in Fig. 8 to its full line position in that figure whereby the transfer mold 41, with the severed preshaped body 21 contained therein, is reseated on the conveyor arm 44.

The conveyor mechanism then indexes this particular conveyor arm 44 to station C, at which station the preshaped body 21 is tamped by apparatus described below. Prior to actual tamping, the transfer mold 41 is elevated from the conveyor arm 44 at station C so that this arm does not have to take the force of the tamping blow. Such elevating is accomplished by an elevator assembly 61 which is positioned at station C and which is caused to operate by a control means described later, to raise the transfer mold 41 up from the conveyor arm 44 after this arm has reached station C. This action is shown in Fig. 9 where the full line showing shows the head 62 of the elevating mechanism 61 in the position it occupies prior to raising the transfer mold 41, and the dotted line showing shows the position of the elevator head 62 when it has raised the transfer mold 41 up from the conveyor arm 44. When the transfer mold 41 is thus supported in raised position, tamping plate 63 descends, in response to force exerted by the piston and cylinder assembly 64, and strikes the exposed surface of the preshaped body 21 to force the body 21 into more intimate engagement with the mold cavity of the supporting transfer mold 41. After it has tamped body 21, the tamping plate 63 is retracted by piston and cylinder assembly 64, which is controlled by a control means described later, and the elevator head 62 moves down to re-seat the transfer mold 41 on the conveyor arm 44.

The conveyor mechanism 43 then indexes to position this particular conveyor arm at station D where, in response to a control means described later, oil, or some other suitable lubricant, is sprayed from nozzle 65 onto the exposed upper surface of the tamped preshaped body 21.

When this is accomplished, the conveyor mechanism 43 indexes this particular conveyor arm 44 to station E where a corrugated surface is formed on the exposed upper surface of the tamped preshaped body 21. To accomplish such corrugating, the transfer mold 41 is first elevated from the conveyor arm 44 at station E and this is done by an elevator mechanism 66 which, in response to a control means described later, raises the transfer mold 41 up from the conveyor arm 44 in the same manner as the elevator mechanism 61 raised this transfer mold up from the conveyor arm at station C.

As the transfer mold 41 is being elevated, a centering plate 67 moves downward to engage the exposed upper surface of the tamped preshaped body 21. This centering plate 67 forms the corrugated surface on said preshaped body and is referred to as being a centering plate since this is a term employed to designate the forming of such a surface on an insulator body which is being taken as an example of the plastic ceramic body being shaped. For such an insulator body, the centering plate forms what is the lower surface of the insulator and also, in addition to the tamping plate 63, forces the body 21 into complete intimate engagement with the walls of the mold cavity in mold 41 so that the upper surface of the insulator is also finally shaped.

The centering plate 67 is driven by a motor 68 which, through the medium of a gear coupling 69, rotates shaft 70 to which the centering plate is connected. When the elevator mechanism 66 starts into action to raise the transfer mold 41 at station E, crank arm 71 also starts rotating to pivot lever 72 about pivot shaft 73 and thus move rotating shaft 70 through the medium of the coupling shown in Fig. 1. Since the movement of arm 71 is in a clockwise direction, shaft 70 will start its movement in a downward direction and can move with respect to the gear ring of gear coupling 69 because the shaft has a splined portion 74 slidably coupled to this gear ring. A plurality of gas jets 75 are positioned to direct flames 76 on the undersurface of the centering plate 67, when this plate is in its elevated position, and thus heat this surface prior to its actual engagement with the exposed upper surface of preshaped body 21. Crank arm 71 is driven by suitable gearing, not shown, and this gearing is, in turn, driven by motor 77 through a suitable clutch mechanism contained in housing 78. By a control means described later, this clutch mechanism is engaged to start the clockwise rotation of arm 71, and thus the downward movement of centering plate 67, when the elevator mechanism 66 raises the transfer mold 41. When this mold is fully raised, crank arm 71 will rotate through its uppermost travel and the arrangement of the apparatus is such that the rotating center plate 67 will engage the upper surface of body 21 and corrugate it at this time. As the crank arm 71 moves downward again, the centering plate leaves the body 21 and returns to its original position, i. e. the position shown in Fig. 1.

After the exposed upper surface of the preshaped body 21 has been centered, i. e. has had a corrugated configuration formed thereon at station E, the elevator mechanism 66 re-seats the transfer mold 41 on conveyor arm 44 and this conveyor arm indexes in two steps to station F. At station F the periphery of the corrugated surface is trimmed to remove excess plastic ceramic material flared outwardly by the centering plate 67. To accomplish such trimming at station F, the transfer mold 41 is first elevated from conveyor arm 44 by means of the trimmer elevator mechanism 79. This elevator mechanism 79 is a fluid actuated piston and cylinder assembly which, in response to a control means described later, operates like the elevator mechanisms 61 and 66 at stations C and E respectively to raise the transfer mold 41 above the conveyor arm 44. However, since there is no downward force directed at the plastic body contained in the transfer mold 41 at station F, the elevator mechanism 79 need not be as large as are the elevator mechanisms 61 and 66.

The piston of elevator mechanism 79 has a splined portion 80 which slidably extends through a cooperating gear plate 81 and terminates at a lifting head 82, the latter being shaped to engage the lower portion of transfer mold 41 to elevate it above the conveyor arm 44. Gear plate 81 is coupled to a beveled gear 83 and the latter is driven by motor 84, said driving being controlled by control means described later. Thus, when the beveled gear 83 rotates it will rotate gear plate 81. By virtue of the splined connection between gear plate 81 and the piston shaft extension 80, the elevator head 82 may be rotated when it is in elevated position. Accordingly, when the elevator head 82 elevates the transfer mold 41 from conveyor arm 44, said transfer mold may be rotated and in the particular embodiment shown in Fig. 1, the rotation will be in a counterclockwise direction. The transfer mold 41 is elevated until the upper edge of the transfer mold reaches trimmer arm 85 which scrapes the excess plastic ceramic material from the periphery of the corrugated surface of the plastic ceramic body 21.

When such trimming has been accomplished, the elevator mechanism 79 re-seats the transfer mold 41 on conveyor arm 44 at station F and this particular conveyor arm then indexes in two steps to station G. At station G the transfer mold 41, which by this time contains a finally shaped plastic ceramic body, is removed from the conveyor arm 44 by a take-off mechanism indicated generally by the reference numeral 86.

The take-off mechanism 86 is substantially identical to the put-on mechanism 46 and, as will be observed from the arrow line diagram of Fig. 11, is controlled so that its movement has a reverse pattern from that of the put-on mechanism 46. Thus, under force exerted by a piston and cylinder assembly 87, the lifting plate 88, which corresponds to lifting plate 47 of the put-on mechanism 46, is caused to move forward until the forward arms of the plate 88 engage the shoulders 53 on transfer mold 41. This movement is indicated by the lower line of the arrow line diagram of Fig. 11. When the lifting plate 88 has reached the end of its forward travel and has thus engaged the transfer mold 41, the plate 88 is then moved up in response to force exerted by a piston and cylinder assembly 89, to lift the transfer mold 41 from within the opening 56 which is in the end portion of conveyor arm 44. This is the movement indicated by the arrow line diagram at the extreme left in Fig. 11.

Having thus lifted tranfer mold 41 from the conveyor arm 44, the plate 88 then carries this transfer mold back (see the top arrow line of Fig. 11) in response to force exerted by the piston and cylinder assembly 87, until the transfer mold is located above the roller conveyor 90. When the transfer mold 41 is so positioned, the lifting plate 88 descends, in response to force exerted by the piston and cylinder assembly 89, to deposit the transfer mold on roller conveyor 90. The plate 88 then returns to the position shown in Fig. 1. After the transfer mold is seated on roller conveyor 90 it is pushed away from in front of the take-off mechanism 87 by means of an ejector arm mechanism 91.

The description thus far has traced the forming and shaping of an individual body of plastic ceramic material. However, when the apparatus is operating on a mass production basis, there will be a number of individual bodies being processed through the apparatus in different stages of completion. In fact, this situation is actually shown in Fig. 1 where one body has just been preshaped at station B, another body has been tamped at station C, another body has been centered, i. e. corrugated, at station E, still another body has been trimmed at station F, and a new transfer mold 41 has just been placed on a conveyor arm 44 at station A and a transfer mold 41 which contains a finally shaped plastic ceramic body has just been removed from a conveyor arm 44 at station G. All of this simultaneous action, and the proper correlation of the various actions so that they will occur in proper sequence whereby repetitive cycles of forming and shaping individual bodies will be correctly keyed together is controlled by a master control mechanism which will now be described.

Broadly described, this master control mechanism is a cam control mechanism having a plurality of cams mounted on a single supporting shaft for the cams and this supporting shaft is driven by a driving motor which rotates the supporting shaft at a predetermined rate of speed and which starts such rotation in response to a signal received from the apparatus at station B, i. e. the station where an individual body is preshaped. Individual cams are offset with respect to each other so that the apparatus which transfers a preshaped body to the conveyor and the apparatus which subsequently finally shapes the preshaped body are brought into play in proper sequence. The put-on mechanism 46 and take-off mechanism 87, and the indexing of the rotatable turntable conveyor 43 are also controlled by cam members whereby transfer molds 41 are put on the conveyor and taken off of the conveyor in proper sequence and the conveyor indexing takes place at the proper time.

The control cams are mounted on a supporting shaft 92 and are actually located in a cam housing 93 (see Fig. 1). As previously mentioned, these cams are shown in Fig. 1 as being exploded out of cam housing 93 to locations adjacent the apparatus controlled by the cams in order to facilitate description of the manner in which this apparatus is controlled. Therefore, despite the fact that the cams are shown in Fig. 1 as being at different locations outside of the cam housing 93, it is re-emphasized that they are all mounted on the same shaft and are actually housed in this housing 93.

The cam supporting shaft 92 is driven at a uniform rate of speed by a driving motor 94. This motor 94 drives shaft 95 through a suitable gear connection contained in housing 96. Driving shaft 95 and the driven cam-supporting shaft 92 are adapted to be coupled by a clutch arrangement which consists of cooperating friction disks 97 and 98, the disk 97 being attached to driving shaft 95 and the disk 98 being attached to driven shaft 92.

During the operation of the apparatus, motor 94 is always energized so that clutch disk 97 is continuously rotating. Hence clutch disk 97 constantly tries to rotate clutch disk 98 and does rotate this clutch disk except when the clutch disk 98 is held against rotation. Clutch disk 98 is held against rotation by a stop pin 99 which engages a shouldered notch 100 located in the periphery of clutch disk 98. It will be appreciated of course that, as viewed in Figs. 1 and 2, the rotation of driving disk 97 is clockwise and consequently this disk urges driven disk 98 to rotate also in a clockwise direction. In fact, all of the cams mounted on cam supporting shaft 92 rotate in a clockwise direction as viewed in Fig. 1.

The purpose of stop pin 99 is to prevent the cam supporting shaft 92 from rotating until a preshaped body 21 is formed in preshaping mold 10 and is thus available for transfer and subsequent final shaping. The stop pin 99 and cooperating shoulder notch 100 thus insure that the sequence of steps following preshaping does not start until a preshaped body of plastic ceramic material is available. Thus, the transfer and subsequent shaping operations are keyed to the preshaping operations.

When the excess plastic ceramic material 20 abuts against the pivotally mounted lever 15 (see Fig. 4) the arm 17 of this lever actuates microswitch 18. What occurs then is best appreciated from Fig. 2 where it will be noted that when arm 17 actuates microswitch 18 an electrical circuit is completed through lead 101, contacts 102, electromagnet 103 and return lead 104. When this circuit is completed electromagnet 103 is energized and lifts stop pin 99 from within notch 100, thus freeing clutch disk 98 for rotation and this disk starts such rotation.

Simultaneously with the making of the circuit through contacts 102, the switch bar 105 also breaks a circuit at contacts 106. The circuit broken at contacts 106 extends from lead 101, through contacts 106, through contacts 107, and through electromagnet 108 to the other side of the electrical supply source. When this circuit is broken by the opening of the circuit at contacts 106, electromagnet 108 is de-energized thus allowing plunger 109, which is held up by the energized electromagnet, to drop down.

When plunger 109 drops down it actuates a fluid control valve located in housing 110 and this valve controls the flow of fluid through conduits 111 in a manner such that the clutch mechanism contained in housing 9 is disengaged, whereupon motor shaft 7 no longer drives the pug mill driving shaft 6. Therefore, rotation of pug mill auger 3 is stopped and thus extrusion of plastic ceramic material from the pug mill nozzle 4 ceases. The details of the fluid control valve 110 and the circuit through fluid transfer conduits 111 plus the details of the clutch mechanism contained in housing 9 are omitted since these do not form per se a part of the present invention. It will be readily appreciated by those skilled in the art that suitable fluid control means, including control valves, etc., may be provided to transmit a control force in a desired manner so long as it is known what the intended control is to be. In the particular embodiment illustrated, the clutch mechanism contained in housing 9 is actually an air operated clutch, the control valve 110 is an air pressure control valve, and the supply conduits 111 are air transfer conduits.

Shortly after the clutch disk 98 starts rotating in a clockwise direction, and after the pug mill has stopped feeding plastic ceramic material through pug mill nozzle 4, cam 112 (see Fig. 1) causes blade member 22 to sever the excess plastic ceramic material 20 from the mouth of preshaping mold exit opening 12. This control is effected in the following manner. The projection 113 on cam 112 moves a control rod 114 upwardly thereby operating a fluid control valve contained within housing 115. This fluid control valve controls the flow of fluid through fluid transfer lines 116 in a manner such that piston 24, to which the blade 22 is operatively connected, is caused to move with respect to cylinder 25 to effect the severing of excess material 20. Details of the mechanism contained in the fluid control valve housing 115 and the detailed construction of the fluid actuated piston 24 and cylinder 25 assembly are omitted since these do not form per se a part of the present invention. In the subsequent reference to the other control cams which will be mentioned, a detailed description of the fact that the cam contains a particular protuberance which actuates a control rod to in turn actuate a control valve, etc. will be omitted since this uniform type of control applies to the other cam actuated mechanisms and need not be repeated. Furthermore, it is shown that cam 112 is supported on shaft 92 but the numeral 92 will not be applied to all of the other cams, to avoid repetition inasmuch as it has been stated that all of the other cams are in fact mounted on this shaft.

When the excess plastic material 20 has been trimmed off by blade 22, the projection 113 on cam 112 will pass from beneath control rod 114 and this control rod will then drop back to its position as shown in Fig. 1. As this occurs the blade 22 is drawn back to its position as shown in Figs. 3 and 4 and is thus ready for another trimming operation. As soon as the blade 22 has trimmed the excess plastic material 20 this material falls and is carried away by chute 26. This releases the pressure on lever 15 which, under the influence of spring 19, returns to its position as shown in Fig. 3. In the position of lever 15 shown in Fig. 3, the contacts 106 of microswitch 18 are reclosed again (see Fig. 2), thus tending to complete the electrical circuit through electromagnet 108. However, cam 117 has meanwhile rotated clockwise sufficiently so that switch bar 118 opens the circuit at contacts 107 thus maintaining electromagnet 108 in de-energized condition even though the switch member 105 has reclosed the circuit at contacts 106. Thus, the pug mill does not start extetruding material through nozzle 4 at this time despite the fact that the control circuit which controls the pug mill feed may be considered to be in "cocked" condition.

After the excess plastic material 20 has been trimmed and the trimming blade 22 has returned to its position of rest, cam 119 actuates fluid control valve 120 to cause the piston 31 to descend with respect to cylinder 33 and thereby withdraw the preshaping mold 10 away from the preshaped body of plastic ceramic material 21. Cam 121 then actuates fluid control valve 122 to cause the piston and cylinder assembly 37 to shift the withdrawn preshaping mold 10 from beneath the preshaped body 21 and to position the elevator head 38 (which elevates the transfer mold 41) beneath the preshaping mold 21. In other words, the piston and cylinder assembly 37 shifts the preshaping mold 10 to the position in which it is shown in Fig. 8, and concurrently positions the elevator head 38 in the position in which it is shown in Fig. 8. Such shifting is accomplished of course by the movement of slide base 35 with respect to supporting base 36.

As the preshaping mold 10 is shifted from beneath the preshaped body 21 and the transfer mold elevator head 38 is brought into position beneath this preshaped body, the cam 123 actuates fluid control valve 124. When fluid control valve 124 is actuated it causes a fluid operated mechanism contained in housing 125 to withdraw stop pin 126 from within one of the notches 127 located about the periphery of index ring 128. Simultaneously, fluid control valve 124 actuates auxiliary fluid control valve 129 to increase the flow of fluid through fluid actuated motor 130. When this occurs, fluid actuated motor 130 rotates the vertical support shaft 45 (which supports the conveyor arms 44) by means of the gear coupling 131 and can do this since the removal of stop pin 126 enables the index ring 128 to turn. Support shaft 45 is rotated in a counterclockwise direction.

Through the medium of a coupling from a gear ring 132 which is carried by shaft 45, an auxiliary control cam 133 (which is not connected to shaft 92) controls auxiliary fluid control valve 129 to cause the motor 130 to start the turntable movement slowly, then speed it up, and then slow it down as the turntable comes to the end of a particular index step. The initial slow start takes place as the point 134 of cam 133 moves away from its position as shown in Fig. 1, the speed up occurs when it is away from this position, and the subsequent slowdown occurs as it returns to the position shown in Fig. 1. This gives smoothness to the indexing action thereby eliminating jerky starting and stopping.

Once the stop pin 126 is removed from a particular notch 127 in index ring 128 and when the projection 135 of cam 123 has passed from beneath control valve 124, the stop pin 126 rides on the peripheral edge of index ring 128 until it re-seats in the next succeeding notch 127 at the end of a particular indexing step. Since the turntable indexes in ten steps in making a complete revolution there are ten index stop notches 127 located about the periphery of index ring 128. Further details concerning the means for rotating the turntable conveyor 43, and for indexing such rotation, are omitted since these details do not per se form a part of the present invention and will be apparent to those skilled in the art. Suffice it to say that the operation of the driving and indexing mechanism for the conveyor turntable 43 is to advance this turntable about a complete circle, at the proper time and in ten equal steps, and to cause the movement to be accomplished quickly and without jerking.

By means of the indexing mechanism just described, a conveyor arm 44 located at station A, which has just had an empty transfer mold 41 seated thereon, is moved from station A to station B so that it positions the transfer mold 41 under the preshaped body 21. Meanwhile the transfer mold elevator head 38 has been positioned to be beneath the transfer mold 41 at station B. Cam 136 then actuates fluid control valve 137 to cause the elevator head 38 to move upward with respect to cylinder 39 and raise the transfer mold 41 to the position shown in dotted outline in Fig. 8. Cam 138 then actuates fluid control valve 139 to cause the piston and cylinder assembly 60 to move the wire cut-off 57 across the mouth of pug mill nozzle 4 and sever the preshaped body 21 from the parent mass of plastic ceramic material 34. The severed body 21 drops into the raised transfer mold 41 and, when the projection on cam 138 passes from beneath control valve 139, the piston and cylinder assembly 60 returns the wire cut-off 57 to its position as shown in Fig. 1. The projection on cam 136 then passes from beneath fluid control valve 137 and this valve then causes elevator head 38 to descend with respect to cylinder 39 until the elevator head reaches the position shown in full lines in Fig. 8. The transfer mold 41, with the preshaped body 21 contained therein, is thus re-seated on conveyor arm 44 at station B.

After this has occurred, projection 140 on cam 123 again actuates fluid control valve 124 to cause the conveyor support shaft 45 to rotate to index this particular conveyor arm 44 from station B to station C. When this particular conveyor arm 44 reaches station C, cam 141 actuates fluid control valve 142 to cause elevator assembly 61 to raise the transfer mold 41 up from conveyor arm 44, i. e. to the position shown in dotted outline in Fig. 9. When the transfer mold is thus raised, control cam 143 actuates control valve 144 to cause the piston and cylinder assembly 64 to move the tamping plate 63 down against the exposed upper surface of the preshaped body 21 which is contained in the raised transfer mold 41 at station C. Following such tamping, the projection on cam 141 passes from beneath control valve 142 and when this occurs the elevator mechanism 61 re-seats the transfer mold 41 on the conveyor arm 44 at station C.

While this tamping operation is taking place, and starting when the conveyor arm 44 moved from station B to station C, the put-on mechanism 46 places an empty transfer mold 41 on the empty conveyor arm 44 which has arrived at station A. This action is started by cam 145 which actuates electrical control relay 146 to energize the control circuit for the put-on mechanism 46. The details of the control circuit for this put-on mechanism are not shown since they do not per se form a part of the present invention and any suitable circuit may be provided to cause the lifting plate 47 to move in response to force exerted by the piston and cylinder assemblies 48 and 49 as previously described. When the control circuit is energized the lifting plate 47 goes through its sequence of operations to lift an empty transfer mold 41 from conveyor 54 and place it on the empty conveyor arm 44 which has arrived at station A.

After elevator head 38 has re-seated transfer mold 41 on the conveyor arm 44 located at station B, control cam 121 actuates fluid control valve 122 to cause the piston and cylinder assembly 37 to re-position the preshaping mold 10 beneath pug mill nozzle 4. Meanwhile the re-seated transfer mold 41 is moved from beneath pug mill nozzle 4 i. e. from station B to station C. Cam 119 then actuates fluid control valve 129 to cause piston 31 to rise with respect to cylinder 33 to re-position the preshaping mold 10 against the discharge mouth of pug mill nozzle 4. By this time the projection 147 on cam 117 has rotated far enough in a clockwise direction so that the leading edge of this projection again engages the roller 148 to lift this roller and hence move the switch bar 118 across contacts 107 to complete the electrical circuit through electromagnet 108.

When this circuit is completed, the electromagnet 108 is energized to draw down control rod 109 and thus actuate fluid control valve 110 which, in turn, causes the clutch mechanism located in housing 9 to couple the rotating motor shaft 7 to the pug mill drive shaft 6 and thus start the pug mill 2 into operation again. Continued operation of the pug mill re-fills the preshaping mold 10 until once more an excess of plastic ceramic material is forced from within the exit opening 12 and when this material has been forced within exit opening 12 as is shown in Fig. 3, another complete rotation of the cam supporting shaft 92 is ready to start. By this time the stop pin 99, which has been riding on the periphery of the clockwise rotating driven clutch disk 98, is again back in the shouldered notch 100 and must be picked up from this notch to allow another complete rotation of the cam supporting shaft 92 to occur. Therefore, unless enough excess plastic ceramic material 20 is forced from within exit opening 12 to trip microswitch 18 (by means of lever 15) another cycle will not start. This is the interlock feature which insures that another cycle will not start unless a preshaped body 21 is available.

Cam supporting shaft 92 makes one complete revolution in the interval of time starting when the excess plastic ceramic material 20 actuates lever 15 to trip microswitch 18, whereby the stop pin 99 is lifted from within the notch 100 in clutch disk 98, and ending when this stop pin once more comes up against the shoulder abutment of notch 100. The ending point is just prior to the time when another body of excess plastic ceramic material 20 is ready to move lever 15 to trip microswitch 18 and start the cycle again. Thus, one complete cycle starts substantially immediately following the forming of a first preshaped body 21 and stops substantially immediately following the forming of a second such body.

During this interval of time a conveyor arm 44 has progressed, in equal steps, from station A to station B and then from station B to station C. As the cycle is repeated, another conveyor arm 44 which, during the preceding cycle moved in two steps from station G to station A, also moves in equal steps from station A to station B and then from station B to station C. When the second conveyor arm 44 moves in two steps from station A to station C, the first mentioned conveyor arm 44 moves in equal steps from station C to station E through station D. Ultimately, there is a plastic ceramic body 21 at each of the shaping stations C, E and F, said bodies undergoing simultaneous treatment. Substantially at the same time, a finally shaped body 21 is removed from the conveyor at station G and an empty transfer mold 41 is placed on the conveyor at station A.

In this manner there are a plurality of operations occurring simultaneously as the various plastic ceramic bodies proceed through the apparatus and the cam supporting shaft 92 contains control cams which cause the simultaneous operations to take place at the proper time. For example, cam 149 actuates fluid control valve 150 to cause the elevator mechanism 66 to raise the transfer mold 41 located at station E and to cause engagement of the clutch mechanism contained in housing 78. When this clutch mechanism is engaged, the crank arm 71 starts to rotate in a clockwise direction whereby the centering plate 67 descends to meet the raised body of plastic ceramic material 21 which is located at station E. Contemporaneously, the cam 151 actuates electrical relay 152 to energize trimmer motor 84 whereby, by means of the gear coupling between gear plate 81 and gear 83, the trimmer elevator head 82 is started into rotation. Substantially at the same time, cam 153 actuates fluid control valve 154 to cause the trimmer elevator mechanism 79 to raise the trimmer elevator head 82 into contact with the transfer mold 41 located at station F and thus lift this transfer mold from the conveyor at this station. Since the lifted mold is rotated, when it comes into operative relationship with the trimmer arm 85, the excess peripheral plastic ceramic material is trimmed from the plastic ceramic body 21 contained in the transfer mold. Of course, when the projections on cams 149 and 153 pass from beneath the respective fluid control valves 150 and 154 which are actuated thereby, the elevator mechanisms 66 and 79 re-seat the transfer mold on the conveyor at stations E and F.

When a finally shaped plastic ceramic body 21 arrives at station G, control cam 155 actuates electrical relay 156 to cause the take-off mechanism 86 to move the transfer mold 41 from the conveyor arm 44 which is located at this station. Substantially simultaneously with the removal of a transfer mold 41 at station G, an empty transfer mold 41 is placed on the conveyor 44 which is located at station A by means of the put-on mechanism 46 which is brought into operation by cam 145.

In summary, it is seen that an individual plastic ceramic body is preshaped, transferred to a conveyor mechanism, and then processed through a series of final shaping operations after which it is removed from the conveyor mechanism. After a first preshaped body has been placed on the conveyor mechanism and started through its series of final shaping operations, a second plastic ceramic body is preshaped, transferred to another arm of the conveyor mechanism and started through its series of final shaping operations just behind the first mentioned plastic ceramic body. The plurality of cams which control the various operations are constructed and arranged so that they cause preshaping of a body at station B, and shaping of previously preshaped bodies, such as those located at stations C, E, and F, all during the time it takes cam supporting shaft 92 to make one complete revolution.

The proper sequencing of the various operations is achieved, in the particular embodiment of the apparatus described and shown herein, by offsetting individual cam projections with respect to each other so that as the cam supporting shaft 92 rotates one particular cam projection will reach its top position before another does. For example, one of the first operations which occurs when cam supporting shaft 92 starts rotating, is the trimming of the excess plastic ceramic material 20 from the mouth of exit opening 12 in preshaping mold 10. Cam 112 controls this operation and it will be noted that the projection 113 on this cam comes into top position substantially immediately following the starting of rotation of cam supporting shaft 92. In contrast, the projection 147 on cam 117 leaves its top position substantially immediately following the start of rotation of cam supporting shaft 92 and does not come into top position again until cam supporting shaft 92 has almost completed its rotation. Cam 117 controls the restarting of the pug mill feed whereby a second preshaped plastic ceramic body 21 is formed after the preceding preshaped body 21 has been removed from the pug mill nozzle 4. Thus, it can be seen that the preshaping of the second body 21 should not occur until near the end of a particular cycle, and does not occur until then because of the relative positioning of cam projection 147.

In the particular embodiment of the invention herein described and illustrated, the subsequent final shaping of a preshaped body and, in fact, each repetitive cycle of forming and shaping an individual body, is initiated by a lever and switch assembly (lever 15 and microswitch 18) which is responsive to the excess plastic ceramic material 20. However, it will be apparent to those skilled in the art that other suitable means could be provided to accomplish such initiating. Said alternative means might be responsive to the excess plastic ceramic material 20 or might even be responsive to the filling of the preshaping mold 10. The central idea is to start a cycle when a body 21 has been preshaped and while a particular switch and lever arrangement is shown as being actuated by excess material, available only after the body 21 has been preshaped, it will be appreciated that other means than this might be provided.

As previously mentioned, the present invention has particular utility in connection with the production of high voltage electrical insulator bodies. By virtue of the mass production possible with the apparatus of the present invention, the cost per body is substantially lower than the comparable cost of manually shaped bodies.

While we have shown and described a particular embodiment of our invention we wish it to be understood that we do not intend to be restricted solely thereto but that we do intend to cover all such modifications thereof as may occur to those skilled in the art and which come within the spirit and scope of our invention.

Having thus described our invention, what is claimed as new and desired to be secured by Letters Patent is:

1. An apparatus for mass producing bodies of plastic ceramic material comprising a preshaping metal first mold having a mold cavity adapted to receive and preshape a predetermined amount of plastic ceramic material, means to feed plastic ceramic material into said first mold cavity until said cavity is filled, means responsive to the material fed into said first mold cavity for stopping said feed means when said cavity is filled, a ceramic second mold having a mold cavity corresponding in size and shape to the first mold cavity whereby said second mold is adapted to receive the material preshaped by said first mold, means to substitute said second mold for said first mold, axially movable rotating tool means to final shape said preshaped body of plastic ceramic material to a desired external configuration while said body is in said second mold, a time cycle control means for timing said substituting and final shaping means in accordance with a predetermined time cycle, and means operatively connecting said time cycle control means to said substituting means and said shaping means.

2. An apparatus for mass producing bodies of plastic ceramic material comprising a preshaping metal first mold having a mold cavity adapted to receive and preshape a predetermined amount of plastic ceramic material, means to feed plastic ceramic material into said first mold cavity until said cavity is filled, means responsive to the material fed into said first mold cavity for stopping said feed means when said cavity is filled, a ceramic second mold having a mold cavity corresponding in size and shape to said first mold cavity whereby said second mold is adapted to receive the material preshaped by said first mold, means to substitute said second mold for said first mold, axially movable rotating tool means to final shape said preshaped body of plastic ceramic material to a desired external configuration while said body is in said second mold, a time cycle control means for timing said substituting and final shaping means in accordance with a predetermined time cycle, means operatively connecting said time cycle control means to said substituting means and said shaping means, and means responsive to the material fed into said first mold cavity for actuating said time cycle control means.

3. An apparatus for forming a ceramic body from plastic ceramic material and subsequently shaping said body to a desired external configuration which comprises means to compact loose ceramic material into a parent mass of plastic ceramic material, a preshaping metal first mold having a mold cavity, means to feed a portion of said parent mass into said cavity until said mold is filled, means to discontinue said feeding when said mold is filled, means to withdraw said first mold from the material fed into it while said material is attached to the parent mass of plastic ceramic material, a ceramic second mold having a mold cavity corresponding in size and shape to said first mold cavity whereby said second mold is adapted to receive said fed material, means to bring said second mold into supporting relation with respect to said preshaped ceramic material, means to sever said preshaped material from the parent mass of plastic ceramic material, and axially movable rotating tool means to shape said severed material to a desired external configuration while said material is in said second mold.

4. An apparatus for mass producing electrical insulator bodies from plastic insulator ingredients and shaping each insulator body to an external configuration which includes a corrugated lower surface and a generally convex upper surface having a knob portion, said apparatus comprising a first mold having a mold cavity with a wall contour corresponding substantially to the external configuration desired for the upper surface of said insulator body, means to feed plastic ceramic insulator ingredients from a parent mass of said ingredients into said first mold cavity until said cavity is filled, a second mold having a mold cavity of substantially the same size and shape as the cavity of said first mold, means to substitute said second mold for said first mold, means to sever the material fed into said first mold from the parent mass of plastic ceramic ingredients only after said second mold has been substituted for the first mold, means to remove said second mold away from said feed means, means to reposition said first mold after said second mold has been removed, and means to restart said feed means after said first mold has been repositioned.

5. An apparatus for mass producing electrical insulator bodies from plastic insulator ingredients and shaping each insulator body to an external configuration which includes a corrugated lower surface and a generally convex upper surface having a knob portion, said apparatus comprising a metal mold having a mold cavity with a wall contour corresponding substantially to the external configuration desired for the upper surface of said insulator body, means to feed plastic ceramic insulator ingredients from a parent mass of said ingredients into said metal mold cavity until said cavity is filled, a plaster of Paris mold having a mold cavity of substantially the same size and shape as the cavity of said metal mold, means to substitute said plaster of Paris mold for said metal mold, means to detach the material fed into said metal mold from the parent mass of plastic ceramic ingredients only after said plaster of Paris mold has been substituted for the metal mold, means to remove said plaster of Paris mold away from said feed means, means to reposition said metal mold after said plaster of Paris mold has been removed, and means to restart said feed means after said metal mold has been repositioned.

6. The method of making a ceramic article which comprises the steps of extruding through a circular orifice a moist plastic ceramic material into a generally cup-shaped preforming metal mold whose mouth is in registration with said orifice until the mold is full, stopping the flow of said material, moving said preforming mold away from the preformed end of said extruded material, placing a water absorbent transfer mold of substantially the same size and shape as said preforming mold over the end of said extruded material which has been preformed by said preforming mold, severing the material in said transformer mold from the material in said orifice, moving said transfer mold away from said orifice, shaping the surface of the material in the mouth of said transfer mold by relative rotation between a centering tool and said transfer mold, and removing said material from said transfer mold.

7. The method of making a ceramic article which comprises the steps of extruding through a circular orifice a moist plastic ceramic material into a generally cup-shaped preforming metal mold whose mouth is in registration with said orifice until the mold is full, stopping the flow of said material, moving said preforming mold away from the preformed end of said extruded material, placing a water absorbent transfer mold for substantially the same size and shape as said preforming mold over the end of said extruded material which has been preformed by said preforming mold, severing the material in said transfer mold from the material in said orifice, moving said transfer mold away from said orifice, tamping the material in the mouth of said transfer mold so as to give final shape to the surface of said material in said transfer mold, applying lubricant to the tamped face of said material in the mouth of said transfer mold, forming concentric grooves in said face by relative rotation between a corrugated centering tool and said transfer mold, and removing said material from said transfer mold.

8. The method of making a ceramic article which comprises the steps of extruding through a circular orifice a moist plastic ceramic material into a generally cup-shaped preforming metal mold whose mouth is in registration with said orifice until the mold is full, stopping the flow of said material, moving said preforming mold axially of said orifice and away from said extruded material, placing a porous ceramic transfer mold of substantially the same size and shape as said metal preforming mold over the end of said extruded material which has been preformed by said preforming mold, severing the material in said transfer mold from the material in said orifice, moving said transfer mold away from said orifice while it is full of said material, tamping surface of the material in the mouth of said transfer mold so as to give final shape to said material in said transfer mold, applying lubricant to the tamped face of said material in the mouth of said transfer mold, forming concentric grooves in said face by relative rotation between a corrugated centering tool and said transfer mold, trimming excess material from the edges of said transfer mold by relative rotation between a trimming tool and said transfer mold, and removing said material from said transfer mold.

9. The method of shaping a ceramic suspension insulator body which comprises the steps of extruding through a circular orifice a moist plastic ceramic material into a generally cup-shaped preforming metal mold whose mouth is in registration with said orifice and which has an outlet opening stopping the flow of said material into said preforming mold when material flows from said outlet opening, moving said preforming mold axially of said orifice and away from the preformed end of said extruded material placing a water absorbent plaster of Paris transfer mold of substantially the same size and shape as said metal preforming mold over the end of said extruded material which has been preformed by said preforming mold, severing the material in said transfer mold from the material in said orifice, moving said transfer mold away from said orifice while it is full of said material, tamping the material in the mouth of said transfer mold so as to give final shape to said material in said transfer mold, applying lubricant to the tamped face of said material in the mouth of said transfer mold, forming concentric grooves in said face by pressing a rotating corrugated centering tool into the material in the face of said transfer mold, trimming excess material from the edges of said transfer mold by rotating said transfer mold relative to a fixed trimming tool and removing said material from said transfer mold.

10. Apparatus for forming ceramic articles comprising, in combination, a generally star-shaped conveyor member having a plurality of arms all lying in a common plane and all having a similar end opening therethrough, means for rotating said conveyor member about a vertical central axis perpendicular to said plane in at least five steps per revolution so as to locate at least five stations at which each arm stops, a first station comprising a plurality of similar generally cup-shaped water absorbent transfer molds each having a mouth and means for seating a mold with the mouth uppermost in the opening of each arm of said conveyor member as it stops at said first station, a second station having a pug mill with a discharge orifice located above and in vertical alignment with the opening in each arm of said conveyor member when said arm is at said second station, a pair of mold elevator mechanisms arranged under said conveyor member in alignment with any arm thereof when it is at said second station, a metal preshaping mold of substantially the same size and shape as said transfer molds on one of said elevator mechanisms, means operative only when said arms are stopped at odd-numbered stations for causing said one elevator mechanism to position said preshaping mold under the discharge orifice of said pug mill with the mouth of the preshaping mold in registration with said discharge orifice and for starting said pug mill whereby moist plastic ceramic material discharged by said pug mill through said orifice will fill said preshaping mold, means for stopping said pug mill when said preshaping mold is full, for lowering said one elevator mechanism carrying said preshaping mold so as to remove said preshaping mold from the preshaped material which is still integral with the parent mass of material in said pug mill and for moving both elevator mechanisms so as to position the other one under the opening in any of said arms when it is at said second station, said means being operative to raise said other elevator mechanism only when said arms are stopped at even-numbered stations so as to lift a transfer mold out of the superposed arm carrying it and fit said transfer mold over said preshaped material, means responsive to the latter operation for cutting the material in the transfer mold away from the parent mass of material and for lowering said other elevator mechanism so as to reseat a transfer mold filled with preshaped ceramic material in the superposed arm, a third station having an elevator mechanism under said conveyor member and a tamping mechanism above said conveyor member, means operative whenever an arm is at said third station for causing the elevator mechanism at said third station to rise through the opening in said arm and raise the filled transfer mold away from said arm, then cause said tamping mechanism to tamp the ceramic material in said transfer mold so as to compact said material and finally to lower said mold away from said tamping mechanism and reseat said mold in the opening in the superposed arm of said conveyor member, a fourth station comprising an elevator mechanism below said conveyor member and a shaping tool above said conveyor member, means for causing the elevator mechanism at said fourth station to lift the transfer mold in the superposed arm of the conveyor member up so as to bring the tamped face of the material in said mold into contact with said tool for stamping a design in said face and for thereafter reseating said mold in said arm, and a fifth station carrying means for removing a transfer mold from the adjacent arm of said conveyor member at said station.

11. Apparatus for forming ceramic articles, comprising, in combination, a generally spider-shaped conveyor member having a plurality of symmetrically arranged arms all lying in a common plane and all having a similar end opening therein, means for rotating said conveyor member about a vertical central axis perpendicular to said plane in at least five steps per revolution so as to locate at least five stations at which each arm stops, a first station comprising a plurality of similar generally cup-shaped ceramic transfer molds each having a circular mouth and means for seating a mold with the mouth uppermost in the opening of each arm of said conveyor member as it stops at said first station, a second station having a plug mill with a circular discharge orifice located above and in vertical alignment with the opening in each arm of said conveyor member when said arm is at said second station, a pair of mold elevator mechanisms arranged under said conveyor member in alignment with any arm thereof when it is at said second station, a metal preshaping mold of substantially the same size and shape as said transfer molds on one of said elevator mechanisms, means operative only when said arms are stopped at odd-numbered stations for causing the said one elevator mechanism to position said preshaping mold under the discharge orifice of said pug mill with the mouth of the preshaping mold in registration with said discharge orifice and for starting said pug mill whereby moist plastic ceramic material discharged by said pug mill through said orifice will fill said preshaping mold, means for stopping said pug mill when said preshaping mold is full, for lowering said one elevator mechanism carrying said preshaping mold so as to remove said preshaping mold from the preshaped material which is still integral with the parent mass of material in said pug mill and for moving both elevator mechanisms so as to position the other one under the opening in any of said arms when it is at said second station, said means being operative to raise said other elevator mechanism only when said arms are stopped at even-numbered stations so as to lift a transfer mold out of the superposed arm carrying it and fit said transfer mold over said preshaped material, means responsive to the latter operation for cutting the material in the transfer mold away from the parent mass of material and for lowering said other elevator mechanism so as to reseat a transfer mold filled with preshaped ceramic material in the superposed arm, a third station having an elevator mechanism under said conveyor member and a tamping mechanism above said conveyor member, means operative whenever an arm is at said third station for causing the elevator mechanism at said third station to rise through the opening in said arm and raise the filled transfer mold away from said arm, then cause said tamping mechanism to tamp the the ceramic material in said transfer mold so as to compact said material and finally to lower said mold away from said tamping mechanism and reseat said mold in the opening in the superposed arm of said conveyor member, a fourth station comprising an elevator mechanism below said conveyor member and a shaping tool above said conveyor member, means for causing the elevator mechanism at said fourth station to lift the transfer mold in the superposed arm of the conveyor member up so as to bring the tamped face of the material in said mold into contact with said tool for causing relative rotation between said transfer mold and tool for turning a radially irregular surface in said face and for thereafter reseating said mold in said arm, and a fifth station comprising means for removing a transfer mold from the adjacent arm of said conveyor member at said station.

12. Apparatus for automatically forming ceramic suspension insulator bodies comprising, in combination, a generally star-shaped conveyor member having at least four symmetrically arranged arms terminating in ends all lying in a common plane and all having a similar opening therethrough, means for rotating said conveyor member about a vertical central axis perpendicular to said plane in at least seven equi-angular steps per revolution so as to locate at least seven stations at which each arm successively stops, a first station comprising a plurality of similar generally cup-shaped porous ceramic transfer molds each having a circular mouth and means for seating a mold with its mouth uppermost in the opening of each arm of said conveyor member as it stops at said first station, a second station having a pug mill with a circular discharge orifice located above and in vertical alignment with the opening in each arm of said conveyor member when said arm is at said second station, a pair of mold elevator mechanisms arranged under said conveyor member in radial alignment with any arm thereof when it is at said second station, a metal preshaping mold of substantially the same size and shape as said transfer mold except that it has a small bottom opening positioned on the outermost of said elevator mechanisms, means operative only when said arms are stopped at odd-numbered stations for causing the outermost elevator mechanism to position said preshaping mold under the discharge orifice of said pug mill with the mouth of the preshaping mold in registration with said discharge orifice and for starting said pug mill whereby moist plastic ceramic material discharged by said pug mill through said orifice will fill said preshaping mold, means responsive to material discharged through said small bottom opening in said preshaping mold for stopping said pug mill when said preshaping mold is full, for lowering the elevator mechanism carrying said preshaping mold so as to remove said preshaping mold from the preshaped material which is still integral with the parent mass of material in said pug mill and for moving both elevator mechanisms radially outward so as to position the radially inner one under the opening in any of said arms when it is at said second stations, said means being operative to raise said inner elevator mechanism only when said arms are stopped at even-numbered stations so as to lift a transfer mold out of the superposed arm carrying it and fit said transfer mold over said preshaped material, means responsive to the latter operation for cutting the material in the transfer mold away from the parent mass of material and for lowering said inner elevator mechanism so as to reseat a transfer mold filled with preshaped ceramic material in the superposed arm, a third station having an elevator mechanism under said conveyor member and a tamping mechanism above said conveyor member, means operative whenever an arm is at said third station for causing the elevator mechanism at said third station to rise through the opening in said arm and raise the filled transfer mold away from said arm, then cause said tamping mechanism to tamp the ceramic material in said transfer mold so as to compact said material and finally to lower said mold away from said tamping mechanism and reseat said mold in the opening in the superposed arm of said conveyor member, a fourth station comprising means for applying lubricant to the tamped face of said material in a transfer mold, a fifth station comprising an elevator mechanism below said conveyor member and a rotating shaping tool above said conveyor member, means for causing the elevator mechanism at said fifth station to lift the transfer mold in the superposed arm of the conveyor member up so as to bring the tamped face of the material in said mold into contact with said rotating tool for turning concentric grooves in said face and for thereafter resisting said mold in said arm, a sixth station having a rotating elevator mechanism below said conveyor member and a fixed trimming tool above said conveyor member, means for causing said rotating elevator mechanism to raise the transfer mold in the arm of said conveyor member at said seventh station up into contact with said trimming tool for trimming away excess ceramic material formed by the shaping operation at the fifth station, and a seventh station comprising means for removing a transfer mold from the adjacent arm of said conveyor member at said station.

13. Apparatus for automatically forming ceramic suspension insulator bodies comprising, in combination, a generally star-shaped conveyor member having five symmetrically arranged arms terminating in flat ends all lying in a common plane and all having a similar opening therethrough, means for intermittently rotating said conveyor member about a vertical central axis perpendicular to said plane in ten equi-angular steps per revolution so as to locate ten stations at which each arm successively stops, a first station comprising a plurality of similar generally cup-shaped plaster of Paris transfer molds each having a circular mouth and means for seating a mold with its mouth uppermost in the opening of each arm of said conveyor member as it stops at said first station, a second station having a pug mill with a circular discharge orifice located above and in vertical alignment with the opening in each arm of said conveyor member when said arm is at said second station, a pair of mold elevator mechanisms arranged under said conveyor member in radial alignment with any arm thereof when it is at said second station, a metal preshaping mold of substantially the same size and shape as said transfer molds except that it has a small bottom opening positioned on the outermost of said elevator mechanisms, means operative only when said arms are stopped at odd-numbered stations for causing the outermost elevator mechanism to position said preshaping mold under the discharge orifice of said pug mill with the mouth of the preshaping mold in registration with said discharge orifice and for starting said pug mill whereby moist plastic ceramic material discharged by said pug mill through said orifice will fill said preshaping mold, means responsive to material discharged through said small bottom opening in said preshaping mold for stopping said pug mill when said preshaping mold is full, for lowering the elevator mechanism carrying said preshaping mold so as to remove said preshaping mold from the preshaped material which is still integral with the parent mass of material in said pug mill and for moving both elevator mechanisms radially outward so as to position the radially inner one under the opening in any of said arms when it is at said second station, said means being operative to raise said inner elevator mechanism only when said arms are stopped at even-numbered stations so as to lift a transfer mold out of the superposed arm carrying it and fit said transfer mold over said preshaped material, means responsive to the latter operation for cutting the material in the transfer mold away from the parent mass of material and for lowering said inner elevator mechanism so as to reseat a transfer mold filled with preshaped ceramic material in the superposed arm, a third station having an elevator mechanism under said conveyor member and a tamping mechanism above said conveyor member, means operative whenever an arm is at said third station for causing the elevator mechanism at said third station to rise through the opening in said arm and raise the filled transfer mold away from said arm, then cause said tamping mechanism to tamp the ceramic material in said transfer mold so as to compact said material and finally to lower said mold away from said tamping mechanism and reseat said mold in the opening in the superposed arm of said conveyor member, a fourth station comprising means for applying lubricant to the tamped face of said material in a transfer mold, a fifth station comprising an elevator mechanism below said conveyor member and a corrugated rotating shaping tool above said conveyor member, means for causing the elevator mechanism at said fifth station to lift the transfer mold in the superposed arm of the conveyor member up so as to bring the tamped face of the material in said mold into contact with said rotating tool for turning concentric grooves in said face and for thereafter reseating said mold in said arm, a blank sixth station, a seventh station having a rotating elevator mechanism below said conveyor member and a fixed trimming tool above said conveyor member, means for causing said rotating elevator mechanism to raise the transfer mold in the arm of said conveyor member at said seventh station up into contact with said trimming tool for trimming away excess ceramic material formed by the shaping operation at the fifth station, a blank eighth station, a ninth station comprising means for removing a transfer mold from the adjacent arm of said conveyor member at said station, and a blank tenth station.

EDWARD M. SKIPPER.
FREDERICK A. ROSE.

REFERENCES CITED

The following references are of record in the file of this patent:

UNITED STATES PATENTS

| Number | Name | Date |
|---|---|---|
| 622,746 | Wolcott | Apr. 11, 1899 |
| 1,615,800 | Eaton | Jan. 25, 1927 |
| 1,663,329 | Austin | Mar. 20, 1928 |
| 2,310,859 | Miller | Feb. 9, 1943 |
| 2,321,471 | Emerson | June 8, 1943 |
| 2,331,702 | Kopitke | Oct. 12, 1943 |
| 2,376,800 | Miller | May 22, 1945 |
| 2,450,437 | Miller | Oct. 5, 1948 |
| 2,469,130 | Rodman, Jr. | May 3, 1949 |
| 2,480,062 | Wahl et al. | Aug. 23, 1949 |
| 2,494,112 | Wahl | Jan. 10, 1950 |